(12) United States Patent
Bishop (10) Patent No.: US 8,690,505 B2
(45) Date of Patent: Apr. 8, 2014

(54) FASTENER ARRANGEMENTS

(75) Inventor: Jeffrey C. Bishop, Derby (GB)

(73) Assignee: Rolls-Royce PLC, London (GB)

( * ) Notice: Subject to any disclaimer, the term of this patent is extended or adjusted under 35 U.S.C. 154(b) by 1043 days.

(21) Appl. No.: 12/680,987

(22) PCT Filed: Oct. 1, 2008

(86) PCT No.: PCT/GB2008/003302
§ 371 (c)(1),
(2), (4) Date: Mar. 31, 2010

(87) PCT Pub. No.: WO2009/056788
PCT Pub. Date: May 7, 2009

(65) Prior Publication Data
US 2010/0209241 A1    Aug. 19, 2010

(30) Foreign Application Priority Data
Oct. 31, 2007 (GB) .................................. 0721325.9

(51) Int. Cl.
*F16B 13/04*  (2006.01)
*F16B 13/10*  (2006.01)

(52) U.S. Cl.
USPC ................. 411/22; 411/15; 411/21; 411/913; 24/453; 24/458

(58) Field of Classification Search
USPC .......................... 411/15, 21, 22, 34, 913, 392; 403/408.1, 409.1; 24/453, 456, 458, 24/460–462, 522, 527, 568; 267/293
See application file for complete search history.

(56) References Cited

U.S. PATENT DOCUMENTS

| 684,497 | A | * | 10/1901 | Davies ............................ 292/31 |
| 1,900,574 | A | * | 3/1933 | Meader ........................... 24/453 |
| 2,006,813 | A | * | 7/1935 | Powers ........................... 411/352 |
| 2,386,922 | A | * | 10/1945 | Andrews et al. ................ 411/15 |

(Continued)

FOREIGN PATENT DOCUMENTS

| DE | 44 16 348 A1 | 6/1995 |
| EP | 1 291 534 A1 | 3/2003 |
| WO | WO 99/08893 A1 | 2/1999 |
| WO | WO 02/47866 A1 | 6/2002 |

OTHER PUBLICATIONS

Apr. 7, 2009 Written Opinion issued in PCT/GB2008/003302.

(Continued)

*Primary Examiner* — Victor Batson
*Assistant Examiner* — Tyler Johnson
(74) *Attorney, Agent, or Firm* — Oliff PLC (57) ABSTRACT

A fastener arrangement for fastening two or more articles together, the two or more articles having a first length, the fastener arrangement including: a fastener including an elongate clamping member for being received in an aperture of the two or more articles, the elongate clamping member being moveable between a contracted configuration in which the elongate clamping member has a length which is less than the first length and a lengthened configuration in which the elongate clamping member has a length which is greater than the first length, the elongate clamping member being resiliently biased towards the contracted configuration; and an actuator for moving the elongate clamping member, while in the aperture of the two or more articles, from the contracted configuration towards the lengthened configuration to enable the elongate clamping member to protrude through the aperture and to engage the articles in a clamping manner.

17 Claims, 5 Drawing Sheets

(56) References Cited

U.S. PATENT DOCUMENTS

| | | | | |
|---|---|---|---|---|
| 2,438,533 A * | 3/1948 | Booth | ............................ | 411/80.6 |
| 2,585,285 A * | 2/1952 | Tonge et al. | .................... | 24/453 |
| 2,758,498 A * | 8/1956 | Johnson | ........................ | 411/508 |
| 2,909,957 A * | 10/1959 | Rapata | ............................ | 411/508 |
| 3,042,156 A * | 7/1962 | Rohe | ............................ | 52/787.12 |
| 3,147,525 A * | 9/1964 | Texier | .............................. | 411/44 |
| 3,153,975 A * | 10/1964 | Rapata | ............................ | 24/295 |
| 3,476,165 A * | 11/1969 | Vaughn | ........................ | 411/103 |
| 4,276,806 A * | 7/1981 | Morel | .............................. | 411/41 |
| 4,352,589 A * | 10/1982 | Allison et al. | ............. | 403/408.1 |
| 4,405,272 A * | 9/1983 | Wollar | ............................ | 411/41 |
| 4,934,885 A * | 6/1990 | Woods et al. | ..................... | 411/44 |
| 4,970,761 A * | 11/1990 | Nakamura | ...................... | 24/453 |
| 5,028,187 A * | 7/1991 | Sato | ................................ | 411/48 |
| 5,065,490 A * | 11/1991 | Wivagg et al. | ............. | 29/402.17 |
| 5,135,341 A * | 8/1992 | Leyder | ........................... | 411/182 |
| 5,223,674 A * | 6/1993 | Reznikov | ................... | 174/138 D |
| 5,259,689 A * | 11/1993 | Arand et al. | ................... | 403/337 |
| 5,407,160 A * | 4/1995 | Hollingsworth et al. | | 248/220.43 |
| 5,452,975 A * | 9/1995 | Grant | ............................. | 411/22 |
| 5,476,350 A * | 12/1995 | Kurtz et al. | ................... | 411/80.2 |
| 5,562,375 A * | 10/1996 | Jackson | ........................... | 411/48 |
| 5,599,512 A * | 2/1997 | Latulippe et al. | ............. | 422/300 |
| 5,601,260 A * | 2/1997 | Shinohara et al. | ........... | 248/68.1 |
| 5,673,887 A * | 10/1997 | Hollingsworth et al. | | 248/220.31 |
| 5,678,953 A * | 10/1997 | Usui et al. | ..................... | 403/329 |
| 5,741,102 A * | 4/1998 | Everett et al. | ................ | 411/339 |
| 5,845,883 A * | 12/1998 | Meyer | .............................. | 248/73 |
| 5,881,982 A * | 3/1999 | Hollingsworth et al. | | 248/220.31 |
| 5,963,275 A * | 10/1999 | Cho | ............................... | 348/836 |
| 6,186,455 B1 * | 2/2001 | Hollingsworth et al. | | 248/220.31 |
| 6,238,230 B1 * | 5/2001 | Sadler et al. | .................. | 439/350 |
| 6,475,030 B1 * | 11/2002 | Chang | ............................ | 439/557 |
| 6,513,205 B1 * | 2/2003 | Mathieu | .......................... | 24/458 |
| 6,652,206 B2 * | 11/2003 | Heflin et al. | ..................... | 411/48 |
| 6,679,712 B2 * | 1/2004 | Chang | ............................ | 439/248 |
| 6,719,512 B2 * | 4/2004 | O'Banion et al. | ............. | 411/456 |
| 6,722,711 B2 * | 4/2004 | Kitzis | ............................. | 292/145 |
| 7,014,408 B2 * | 3/2006 | O'Banion et al. | ............. | 411/448 |
| 7,082,650 B2 * | 8/2006 | Awakura et al. | ................ | 24/458 |
| 7,377,823 B2 * | 5/2008 | Chen | .............................. | 439/751 |
| 7,731,888 B2 * | 6/2010 | Nowicky et al. | ............. | 264/438 |
| 7,736,107 B2 * | 6/2010 | Okada | ............................. | 411/41 |
| 7,908,717 B2 * | 3/2011 | Alhof et al. | ..................... | 24/289 |
| 7,993,084 B2 * | 8/2011 | Hitchcock | ....................... | 411/45 |
| 8,081,481 B2 * | 12/2011 | Wright et al. | .................. | 361/747 |
| 8,356,964 B2 * | 1/2013 | Rottinghaus | ................... | 411/502 |
| 8,517,650 B2 * | 8/2013 | Niklewicz et al. | ............ | 411/57.1 |
| 2003/0053881 A1 * | 3/2003 | Huang et al. | ..................... | 411/34 |
| 2007/0289107 A1 * | 12/2007 | Alhof et al. | ..................... | 24/297 |
| 2008/0112138 A1 * | 5/2008 | Lin | ................................ | 361/704 |
| 2010/0209241 A1 * | 8/2010 | Bishop | ........................ | 415/214.1 |
| 2011/0206476 A1 * | 8/2011 | Brewer | ............................ | 411/22 |
| 2013/0228538 A1 * | 9/2013 | Engelvin et al. | ........... | 211/41.17 |

OTHER PUBLICATIONS

Apr. 7, 2009 International Search Report issued in PCT/GB2008/003302.

* cited by examiner

FASTENER ARRANGEMENTS

Embodiments of the present invention relate to fastener arrangements. They relate to fastener arrangements for gas turbine engines.

In many industries, it is desirable to fasten and clamp together a plurality of articles so that they effectively become a unitary body. For example, it is often desirable to clamp together two or more sheets of metal in the manufacture of gas turbine engines.

The fasteners which are currently used comprise a resiliently deformable head with two or more barbed arms which extend from the head. In order to insert such a fastener, it is necessary to insert the fastener into an aperture of the plurality of articles with a large insertion force so that the head may deform and allow the barbed arms to engage the plurality of articles in a clamping manner.

However, the above mentioned fasteners are not suitable for all applications. If the plurality of articles are delicate, the large insertion force needed for the fastener may damage the articles. Additionally, if there is little space around the plurality of articles, it may be difficult to provide a sufficiently large force to deform the head so that the fastener may engage the plurality of articles.

Therefore, it is desirable to provide an alternative fastener arrangement.

According to various embodiments of the present invention, there is provided a fastener arrangement for fastening two or more articles together, the two or more articles having a first length, the fastener arrangement comprising: a fastener including an elongate clamping member for being received in an aperture of the two or more articles, the elongate clamping member being moveable between a contracted configuration in which the elongate clamping member has a length which is less than the first length and a lengthened configuration in which the elongate clamping member has a length which is greater than the first length, the elongate clamping member being resiliently biased towards the contracted configuration; and an actuator for moving the elongate clamping member, while in the aperture of the two or more articles, from the contracted configuration towards the lengthened configuration to enable the elongate clamping member to protrude through the aperture and to engage the articles in a clamping manner.

The fastener arrangement may further comprise a guide. The guide may include a recess for receiving the elongate clamping member of the fastener. The guide and fastener combination may be moved through the aperture together.

The guide may include the actuator for moving the elongate clamping member. The actuator may be arranged such that when the guide is removed from the fastener when the elongate clamping member is in the aperture, the actuator acts on the elongate clamping member and moves it from the contracted configuration towards the lengthened configuration.

The fastener may comprise a substantially straight elongate holding member for being received in the aperture of the articles. The elongate holding member may have a length which is greater than the first length. The elongate holding member may be arranged to prevent the fastener from being removed from the two or more articles accidentally.

The fastener arrangement may further comprise a locking mechanism arranged to be received in the aperture, adjacent the elongate clamping member, and to prevent the fastener from being removed from the two or more articles.

When the elongate clamping member is in the contracted configuration, the elongate clamping member may have a concave profile. When the elongate clamping member is in the lengthened configuration, the elongate clamping member may have a substantially straight profile.

According to various embodiments of the present invention, there is provided a gas turbine engine comprising a fastener arrangement as described in the preceding paragraphs.

According to various embodiments of the present invention, there is provided a method of fastening two or more articles together, the two or more articles having a first length, the method comprising: providing a fastener including an elongate clamping member; inserting the elongate clamping member into an aperture of the two or more articles, the elongate clamping member being moveable between a contracted configuration in which the elongate clamping member has a length which is less than the first length and a lengthened configuration in which the elongate clamping member has a length which is greater than the first length, the elongate clamping member being resiliently biased towards the contracted configuration; and moving the elongate clamping member, while in the aperture of the two or more articles, from the contracted configuration towards the lengthened configuration to enable the elongate clamping member to protrude through the aperture and to engage the articles in a clamping manner.

The method may further comprise providing a guide which includes a recess; inserting the elongate clamping member of the fastener into the recess of the guide and moving the combination of the guide and the fastener through the aperture together.

The method may further comprise removing the guide from the fastener while the elongate clamping member is in the aperture.

When the guide is removed from the fastener, an actuator portion of the guide may act on the elongate clamping member and may move it from the contracted configuration towards the lengthened configuration.

The fastener may further comprise a substantially straight elongate holding member for being received in the aperture of the articles. The elongate holding member may have a length greater than the first length. The elongate holding member may be arranged to prevent the fastener from being removed from the two or more articles accidentally.

The fastener arrangement may further comprise providing a locking mechanism and inserting the locking mechanism in the aperture, adjacent the elongate clamping member, to prevent the fastener from being removed from the two or more articles.

When the elongate clamping member is in the contracted configuration, the elongate clamping member may have a concave profile. When the elongate clamping member is in the lengthened configuration, the elongate clamping member may have a substantially straight profile.

For a better understanding of the present invention reference will now be made by way of example only to the accompanying drawings in which.

FIGS. 2 to 6 illustrate a fastener arrangement 22 for fastening two or more articles 62 together, the two or more articles 62 having a first length, the fastener arrangement 22 comprising: a fastener 24 including an elongate clamping member 36 for being received in an aperture 64 of the two or more articles 62, the elongate clamping member 36 being moveable between a contracted configuration in which the elongate clamping member 36 has a length which is less than the first length and a lengthened configuration in which the elongate clamping member 36 has a length which is greater than the first length, the elongate clamping member being resiliently biased towards the contracted configuration; and an actuator 50 for moving the elongate clamping member 36, while in the aperture 64 of the two or more articles 62, from the contracted configuration towards the lengthened configuration to enable the elongate clamping member 36 to protrude through the aperture 64 and to engage the articles 62 in a clamping manner.

Figure 1:
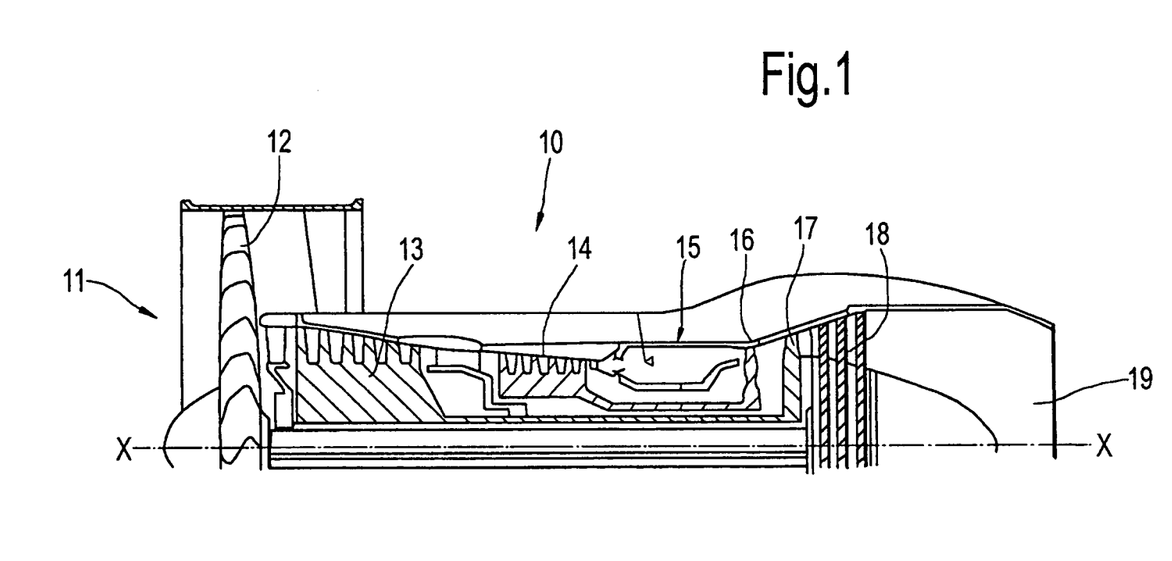
FIG. 1 illustrates a sectional side view of the upper half of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 20.

Figure 2:
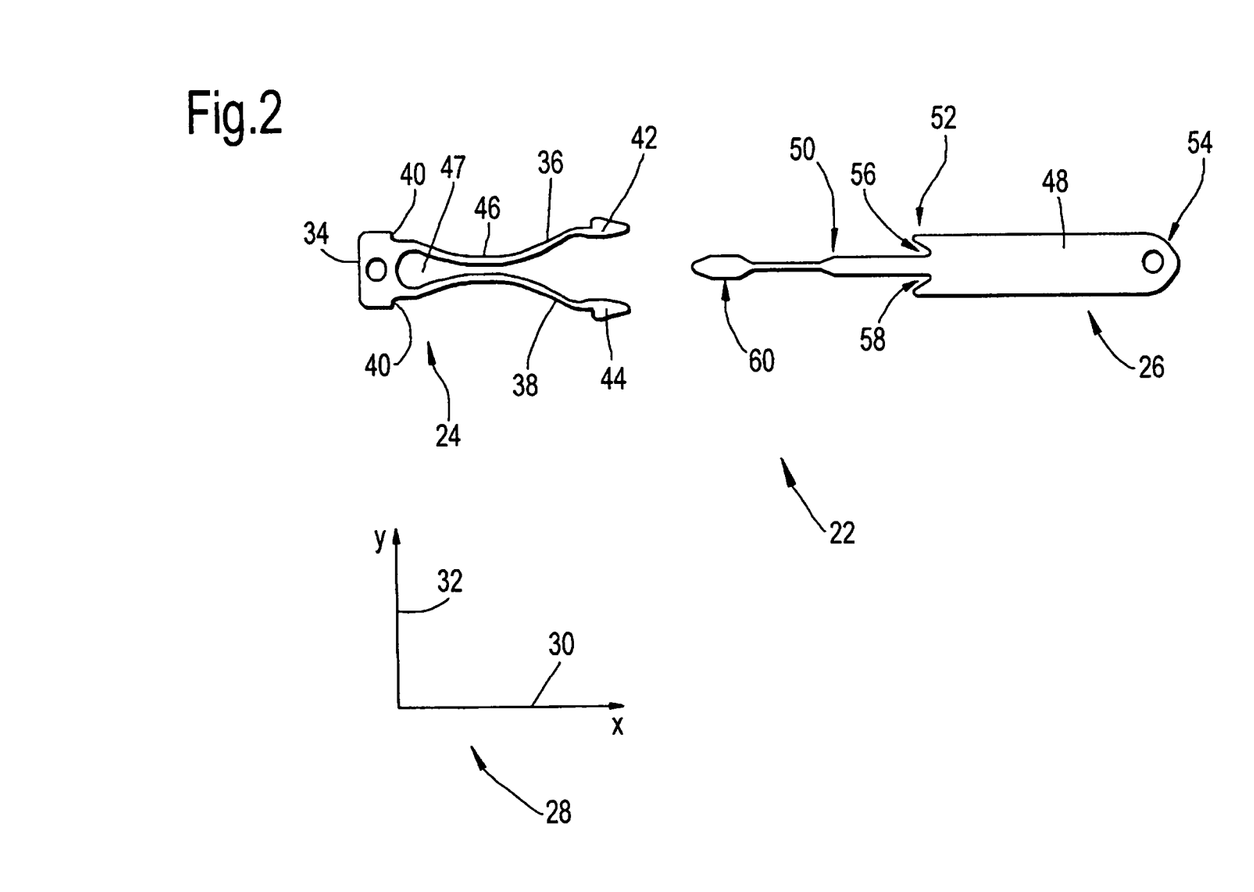
FIG. 2 illustrates a side view of a fastener arrangement according to one embodiment of the present invention.

FIG. 2 illustrates a side view of a fastener arrangement 22 according to one embodiment of the invention. The fastener arrangement 22 may be used to fasten together two or more articles in the gas turbine engine 10. For example, the fastener arrangement 22 may be used to fasten together two or more casing sections of the gas turbine engine 10.

A Cartesian co-ordination system 28 is also illustrated which includes an X axis 30 and a Y axis 32 which are orthogonal to one another. The co-ordinate system shall be used in the following description to describe the structure of the fastener arrangement 22 in detail.

The fastener arrangement 22 includes a fastener 24 for fastening two or more articles together and a guide 26 for guiding the fastener through an aperture of the two or more articles. The fastener 24 comprises a body 34, a first elongate clamping member 36 and a second elongate clamping member 38. In this embodiment, the fastener 24 and the guide 26 comprise a metal such as titanium. However, in other embodiments the fastener 24 and the guide 26 may comprise other materials such as plastics.

The first and second elongate clamping members 36, 38 extend from the centre of the body 34 and define abutment surfaces 40 on the body 34 between where the elongate clamping members 36, 38 extend from the body 34 and the periphery of the body 34. The function of the abutment surfaces 40 will be explained in more detail in the following paragraphs with reference to FIGS. 3A to 3E.

The first and second elongate clamping members 36, 38 extend from the body 34 in the +X direction and each end at a barb 42, 44 respectively. The elongate clamping members 36, 38 are moveable between a contracted configuration (as illustrated in FIG. 2) and a lengthened configuration (as illustrated in FIG. 3D for example). The elongate clamping members 36, 38 are resiliently biased towards the contracted configuration.

In this embodiment, the elongate clamping members 36, 38 have a concave profile when they are in the contracted configuration. For example if the first elongate clamping member 36 is considered, the first elongate clamping member 36 curves in the +X and −Y directions until a mid-point 46 and then curves to the barb 42 in the +X and +Y directions. If the second elongate clamping member 38 is considered, the second elongate clamping member 38 curves in the +X and +Y directions until the mid-point 46 and then curves to the barb 44 in the +X and −Y directions.

In this embodiment, the elongate clamping members 36, 38 have a straightened profile when they are in the lengthened configuration. Consequently, in the lengthened configuration the first and second elongate clamping members 36, 38 extend substantially only in the +X direction from the body 34 (it should be appreciated that the first and second elongate clamping members 36, 38 may have some curvature when in the lengthened configuration and have a small +/−Y component of extension).

The first and second elongate clamping members 36, 38 and the body 34 define a cavity 47 whose purpose will be described in the following paragraphs.

The guide 26 includes a body 48 and an actuator 50 which extends from a first end 52 of the body 48 in the −Y direction. The second end 54 of the body 48 (opposite to the first end 52) is tapered to a curved end. The first end 52 of the body 48 and the actuator 50 define a first recess 56 and a second recess 58 which are arranged to receive the barbs 42, 44 of the fastener 24.

The actuator 50 extends from the first end 52 of the body 48 in the −Y direction to form a cam lobe 60. The cam lobe 60 has a relatively low coefficient of friction and the tangent of its surface forms a relatively small angle with respect to the X axis 30. The cam lobe 60 is arranged so that it may be received in the cavity 47 of the fastener 24. The function of the cam lobe 60 will be explained in detail in the following paragraphs.

The operation of the fastener arrangement 22 will now be described in detail with reference to FIGS. 3A to 3E. Since the fastener arrangement 22 illustrated in FIGS. 3A to 3E is similar to the fastener arrangement 22 illustrated in FIG. 2, the same reference numerals are used where the features are the same or similar.

Figure 3A:
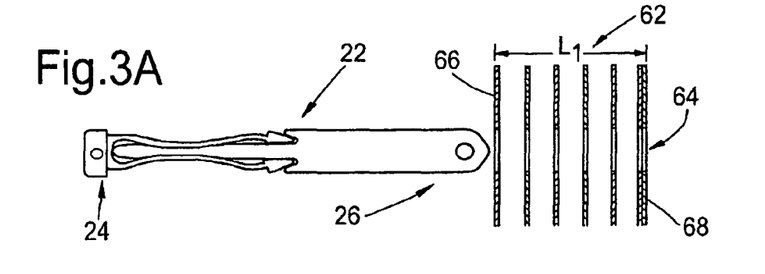
FIGS. 3A, 3B, 3C, 3D and 3E illustrate a series of sequential side view diagrams that show how a fastener and a guide are used in order to clamp a plurality of articles together according to one embodiment of the invention.

The initial step is illustrated in FIG. 3A where the guide 26 has been combined with the fastener 24 so that the barbs 42, 44 of the elongate clamping members 36, 38 are retained by the recesses 56, 58 in the body 48 respectively and so that the cam lobe 60 is retained in the cavity 47.

Prior to this step, the first and second elongate clamping members 36, 38 have been moved together in the Y axis direction and coupled to one another as mentioned in the previous paragraph. It should be appreciated that when both the elongate clamping members 36, 38 are acted on so that they may fit in the recesses 56, 58, the NET force for moving them together is substantially equal to zero.

Also illustrated in FIG. 3A is a plurality of articles 62 which define an aperture 64 and have a first outer surface 66 and a second outer surface 68. In this embodiment, the plurality of articles 62 are a plurality of metal sheets which have a depth of $L_1$ (measured between the first outer surface 66 and the second outer surface 68). It should be appreciated that in other embodiments, the plurality of articles 62 may be any other articles which require clamping. In this figure, the fastener arrangement 22 is ready to be inserted into the aperture 64.

Figure 3B:
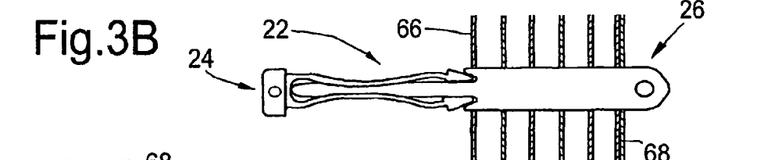

In FIG. 3B the fastener arrangement 22 is inserted in the aperture 64 so that the second end 54 of the guide 26 is protruding from the aperture 64 beyond the second outer surface 68. Since the cross section of the aperture 64 is greater than the cross section of the body 48, the fastener arrangement 22 may be relatively easily inserted into the aperture 64.

Figure 3C:
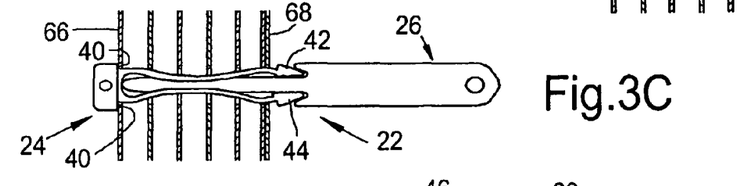
Figure 3D:
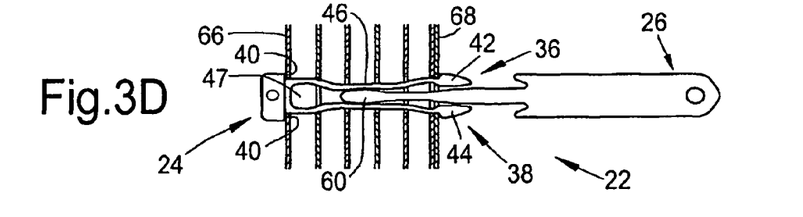

In FIG. 3C the fastener arrangement 22 has been inserted into the aperture 64 so that the abutment surfaces 40 of the fastener 24 abut the first outer surface 66 of the plurality of articles 62. At this step, the length of the fastener 24 is less than the depth $L_1$ of the plurality of articles 62 and consequently, the barbs 42, 44 do not engage the second outer surface 68 of the plurality of articles 62.

In FIG. 3D the guide 26 is being removed from the fastener 24 and the cam lobe 60 has moved from the cavity 47 to the mid-point 46. As the width of the cam lobe 60 is greater than the distance between the first and second elongate members at the mid-point 46, the cam lobe 60 acts on the first and second elongate clamping members 36, 38 and moves them towards the lengthened configuration and thereby makes the length of the fastener greater than the depth $L_1$ of the plurality of articles 62. Consequently, at this step the barbs 36, 38 extend beyond the aperture 64 so that they abut and engage the second outer surface 68 of the plurality of articles 62.

Figure 3E:
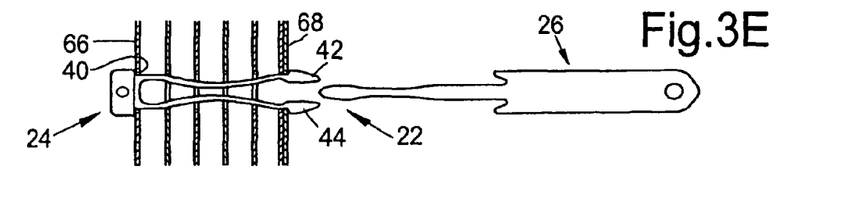

In FIG. 3E the guide 26 has been removed from the fastener 24. At this step, the first and second elongate clamping members 36, 38 move toward the contracted configuration due to their resilient bias. Since the length of the fastener 24 when in the contracted state is less than the depth $L_1$ of the plurality of articles 62, the fastener 24 exerts a clamping force on the plurality of articles 62 and thereby clamps them together between the abutment surfaces 40 and the barbs 42, 44.

In FIG. 3E, each of the plurality of articles 62 are illustrated as being separated by a space. It should be appreciated however, that each of the plurality of articles 62 abut one another and that this abutment occurs outside of the figure. In other embodiments, each of the plurality of articles 62 abut one another along their surface and there is no space between each of the plurality of articles 62 when clamped by the fastener 24.

Embodiments of present invention provide an advantage in that the fastener arrangement 22 is relatively easy to insert into an aperture of a plurality of articles and therefore doesn't require a large insertion force. Consequently, embodiments of the present invention are less likely to damage the outer surface of a plurality of articles during insertion. Additionally, the provision of an actuator for moving the elongate clamping members 36, 38 from the contracted configuration toward the lengthened configuration enables the fastener to engage and clamp the plurality of articles together with greater force.

The arrangement of the cam lobe 60 provides an advantage in that it moves the elongate clamping members 36, 38 from the contracted configuration towards the lengthened configuration. The cam lobe 60 is also relatively easy to remove from the fastener 24 since it does not require a large removal force (due to its low coefficient of friction and small surface tangent angles). This may result in less or no damage being done to the plurality of articles 62 during removal of the guide 26 from the fastener 24.

Figure 4:
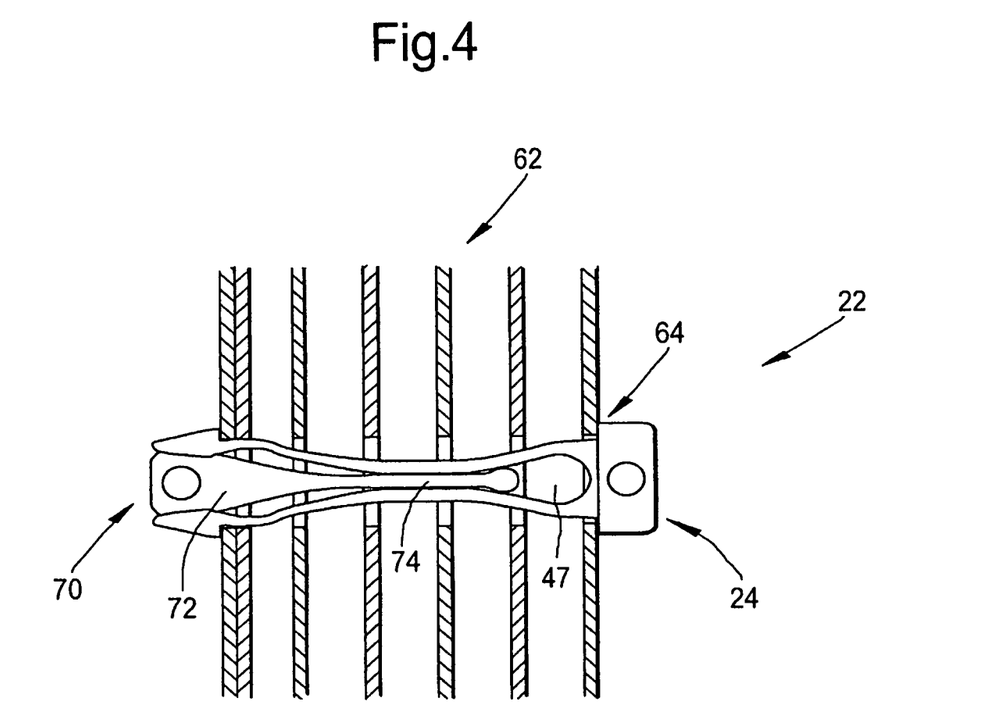
FIG. 4 illustrates a side view of a fastener arrangement according to another embodiment of the invention.

FIG. 4 illustrates a fastener arrangement 22 according to another embodiment of the present invention. Where the features illustrated in FIG. 4 are the same or similar to those illustrated in FIG. 2, the same reference numerals are used.

In this figure, a fastener 24 is inserted in an aperture 64 of a plurality of articles 62 and is clamping them together as described in the previous paragraphs. In this embodiment, the fastener arrangement 22 includes a locking mechanism 70 which is arranged to be inserted between the first and second elongate clamping members 36, 38 when the fastener 24 is inserted in the aperture 64 and thereby prevent them from being accidentally knocked from the contracted configuration to the lengthened configuration.

In more detail, the locking mechanism 70 includes a locking portion 72 which is shaped and sized to fit snugly between the first and second elongate clamping members 36, 38 when they are inserted in the aperture 64. The locking mechanism 70 also includes a neck portion 74 which is arranged to extend into the cavity 47 of the fastener 24. The neck portion 74 includes a larger part at its end which is for location in the cavity 47 and which prevents the locking mechanism 70 from being removed accidentally from the fastener 24.

It should be appreciated that the locking mechanism 70 provides an advantage in that it may improve the safety of a device which includes the fastener arrangement 22 because the locking mechanism 70 may prevent the fastener 24 from being accidentally removed from the plurality of articles 62.

Figures 5, 6:
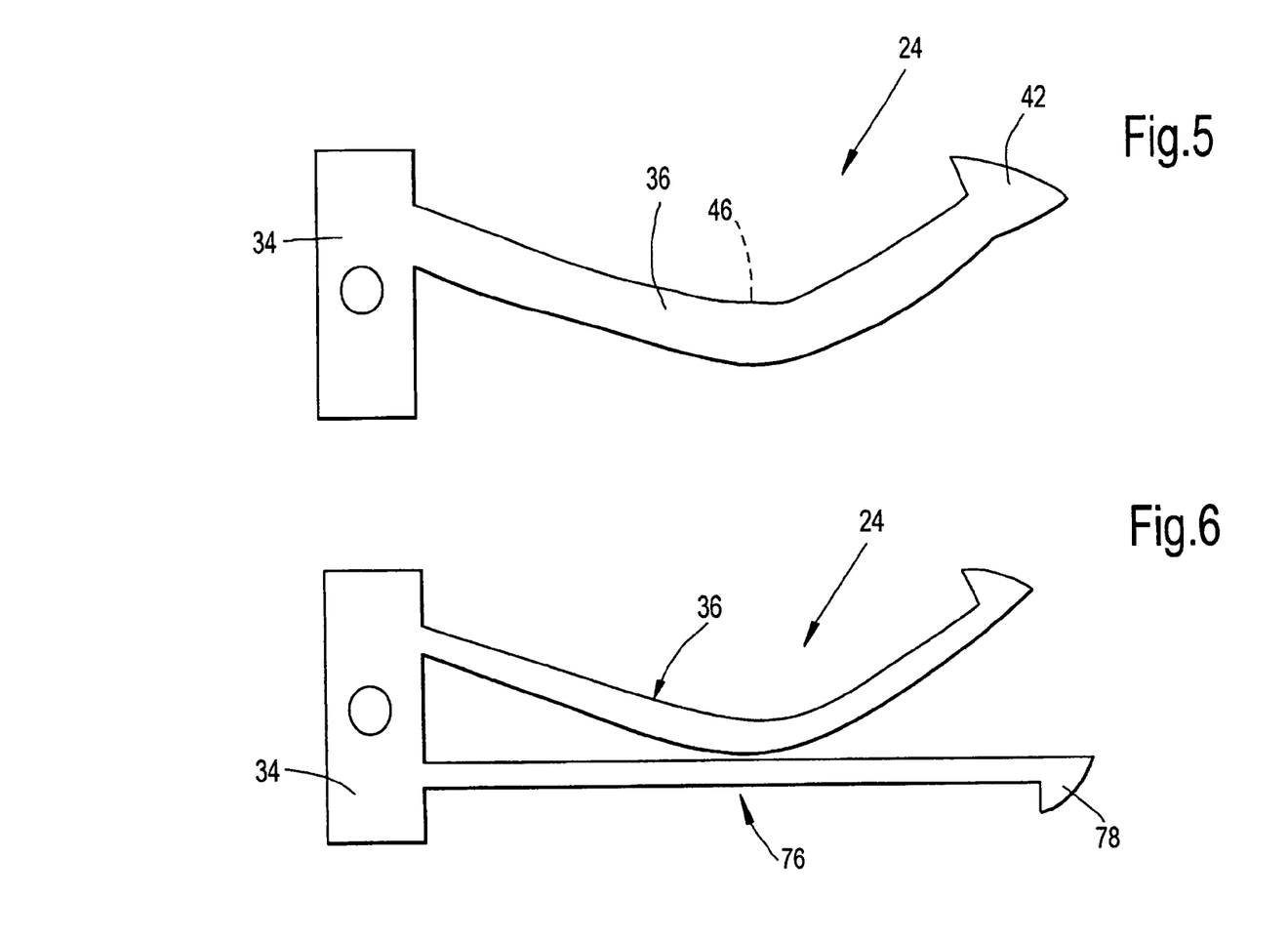
FIG. 5 illustrates a side view of a fastener according to one embodiment of the invention.
FIG. 6 illustrates a side view of a fastener according to another embodiment of the invention.

FIG. 5 illustrates a side view of a fastener 24 according to one embodiment of the present invention. Where the features illustrated in FIG. 5 are similar to those illustrated in FIG. 2, the same reference numerals are used.

In this embodiment, the fastener 24 is the same as the fastener 24 illustrated in FIG. 2 but only includes a single elongate clamping member 36, i.e. the fastener 24 does not include the second elongate clamping member 38. The operation of the fastener 24 illustrated in FIG. 5 is the same as that illustrated in FIGS. 3A to 3E and will not be repeated here.

FIG. 6 illustrates a side view of a fastener 24 according to another embodiment of the present invention. Where the features illustrated in FIG. 6 are similar to those illustrated in FIG. 2, the same reference numerals are used.

In this embodiment, the fastener 24 is the same as the fastener illustrated in FIG. 2 but includes an elongate holding member 76 instead of the second elongate clamping member 38. The elongate holding member 76 is substantially straight in profile, has only one configuration and includes a barb 78 at the end opposite to the body 34. The length of the elongate holding member 76 is greater than the depth $L_1$ of the plurality of articles 62 (not illustrated in this figure for clarity purposes). The operation of the fastener 24 is similar to the operation illustrated in FIGS. 3A to 3E and will consequently not be described in detail here.

The embodiment illustrated in FIG. 6 provides an advantage in that it may improve the safety of a device which includes the fastener 24. If the first elongate clamping member 36 is accidentally knocked when it is in an aperture of a plurality of articles, the elongate holding member 78 prevents the fastener 24 from being removed from the plurality of articles 62 since it only has a single configuration in which the length of the member 76 is greater than the depth of the plurality of articles. Consequently, the barb 78 of the elongate holding member 76 continues to engage the plurality of articles 62 even if the fastener 24 is accidentally knocked.

It should be appreciated that embodiments of the present invention may be used in various different applications. Since the insertion force of the fastener arrangement into a plurality of articles and the removal force of the guide from the fastener are relatively small, embodiments of the present invention provide an advantage when used in applications where the plurality of articles are delicate. For example, embodiments of the present invention may be particularly advantageous when used in surgery on the human or animal body.

Although embodiments of the present invention have been described in the preceding paragraphs with reference to various examples, it should be appreciated that modifications to the examples given can be made without departing from the scope of the invention as claimed. For example, a fastener 24 may include more than two elongate clamping members and more than one elongate holding member.

The invention claimed is:

1. A fastener arrangement for fastening two or more articles together, the two or more articles having a first length, the fastener arrangement comprising:
 a fastener including an elongate clamping member for being received in an aperture of the two or more articles, the elongate clamping member being moveable between a contracted configuration in which the elongate clamping member has a length which is less than the first length and a lengthened configuration in which the elongate clamping member has a length which is greater than the first length, the elongate clamping member being resiliently biased towards the contracted configuration;
 an actuator for moving the elongate clamping member, while in the aperture of the two or more articles, from the contracted configuration towards the lengthened configuration to enable the elongate clamping member to protrude through the aperture and to engage the articles in a clamping manner; and
 a guide which includes a recess for receiving the elongate clamping member of the fastener, wherein the guide and fastener combination are adapted to be moved through the aperture together.

2. A fastener arrangement as claimed in claim 1, wherein the guide includes the actuator for moving the elongate clamping member.

3. A fastener arrangement as claimed in claim 1, wherein the fastener comprises a substantially straight elongate holding member for being received in the aperture of the articles, the elongate holding member having a length greater than the first length and being arranged to prevent the fastener from being removed from the two or more articles accidentally.

4. A fastener arrangement as claimed claim 1, further comprising a locking mechanism arranged to be received in the aperture, adjacent the elongate clamping member, and to prevent the fastener from being removed from the two or more articles.

5. A fastener arrangement as claimed in claim 1, wherein when the elongate clamping member is in the contracted configuration, the elongate clamping member has a concave profile.

6. A fastener arrangement as claimed in claim 1, wherein when the elongate clamping member is in the lengthened configuration, the elongate clamping member has a substantially straight profile.

7. A fastener arrangement as claimed in claim 1, wherein the elongate clamping member has a barbed end.

8. A fastener arrangement as claimed in claim 1, wherein the guide and fastener combination are configured to be moved through the aperture together in a direction along the central axis of the aperture.

9. A fastener arrangement as claimed in claim 1, wherein the fastener further comprises a cavity, wherein the actuator is received in the cavity of the fastener.

10. A fastener arrangement for fastening two or more articles together, the two or more articles having a first length, the fastener arrangement comprising:
 a fastener including an elongate clamping member for being received in an aperture of the two or more articles, the elongate clamping member being moveable between a contracted configuration in which the elongate clamping member has a length which is less than the first length and a lengthened configuration in which the elongate clamping member has a length which is greater than the first length, the elongate clamping member being resiliently biased towards the contracted configuration;
 an actuator for moving the elongate clamping member, while in the aperture of the two or more articles, from the contracted configuration towards the lengthened configuration to enable the elongate clamping member to protrude through the aperture and to engage the articles in a clamping manner; and
 a guide which includes a recess for receiving the elongate clamping member of the fastener, wherein:
 the guide and fastener combination are adapted to be moved through the aperture together,
 the guide includes the actuator for moving the elongate clamping member, and
 the actuator is arranged such that when the guide is removed from the fastener when the elongate clamping member is in the aperture, the actuator acts on the elongate clamping member and moves it from the contracted configuration towards the lengthened configuration.

11. A method of fastening two or more articles together, the two or more articles having a first length, the method comprising:
 providing a fastener including an elongate clamping member;
 inserting the elongate clamping member into an aperture of the two or more articles, the elongate clamping member being moveable between a contracted configuration in which the elongate clamping member has a length which is less than the first length and a lengthened configuration in which the elongate clamping member has a length which is greater than the first length, the elongate clamping member being resiliently biased towards the contracted configuration;
 inserting the elongate clamping member of the fastener into a recess included on a guide and moving the combination of the guide and the fastener through the aperture together; and
 moving the elongate clamping member, while in the aperture of the two or more articles, from the contracted configuration towards the lengthened configuration to enable the elongate clamping member to protrude through the aperture and to engage the articles in a clamping manner.

12. A method as claimed in claim 11, wherein the fastener further comprises a substantially straight elongate holding member for being received in the aperture of the articles, the elongate holding member having a length greater than the first length and being arranged to prevent the fastener from being removed from the two or more articles accidentally.

13. A method as claimed in claim 11, further comprising providing a locking mechanism and inserting the locking mechanism in the aperture, adjacent the elongate clamping member, to prevent the fastener from being removed from the two or more articles.

14. A method as claimed in claim 11, wherein when the elongate clamping member is in the contracted configuration, the elongate clamping member has a concave profile.

15. A method as claimed in claim 11, wherein when the elongate clamping member is in the lengthened configuration, the elongate clamping member has a substantially straight profile.

16. A method of fastening two or more articles together, the two or more articles having a first length, the method comprising:
- providing a fastener including an elongate clamping member;
- inserting the elongate clamping member into an aperture of the two or more articles, the elongate clamping member being moveable between a contracted configuration in which the elongate clamping member has a length which is less than the first length and a lengthened configuration in which the elongate clamping member has a length which is greater than the first length, the elongate clamping member being resiliently biased towards the contracted configuration;
- inserting the elongate clamping member of the fastener into a recess included on a guide and moving the combination of the guide and the fastener through the aperture together;
- moving the elongate clamping member, while in the aperture of the two or more articles, from the contracted configuration towards the lengthened configuration to enable the elongate clamping member to protrude through the aperture and to engage the articles in a clamping manner; and
- removing the guide from the fastener while the elongate clamping member is in the aperture.

17. A method as claimed in claim 16, wherein when the guide is removed from the fastener, an actuator portion of the guide acts on the elongate clamping member and moves it from the contracted configuration towards the lengthened configuration.

* * * * *